(12) United States Patent
Sung et al.

(10) Patent No.: US 11,862,183 B2
(45) Date of Patent: Jan. 2, 2024

(54) METHODS OF ENCODING AND DECODING AUDIO SIGNAL USING NEURAL NETWORK MODEL, AND DEVICES FOR PERFORMING THE METHODS

(71) Applicant: Electronics and Telecommunications Research Institute, Daejeon (KR)

(72) Inventors: Jongmo Sung, Daejeon (KR); Seung Kwon Beack, Daejeon (KR); Mi Suk Lee, Daejeon (KR); Tae Jin Lee, Daejeon (KR); Woo-taek Lim, Daejeon (KR); Inseon Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 190 days.

(21) Appl. No.: 17/368,390

(22) Filed: Jul. 6, 2021

(65) Prior Publication Data
US 2022/0005487 A1  Jan. 6, 2022

(30) Foreign Application Priority Data

Jul. 6, 2020 (KR) .................. 10-2020-0083075
Apr. 16, 2021 (KR) .................. 10-2021-0049753

(51) Int. Cl.
*G10L 19/032* (2013.01)

(52) U.S. Cl.
CPC .................. *G10L 19/032* (2013.01)

(58) Field of Classification Search
CPC ... G10L 19/0208; G10L 15/24; G10L 19/005; G10L 25/18; G10L 15/00; G10L 15/22; G10L 19/032
See application file for complete search history.

(56) References Cited

U.S. PATENT DOCUMENTS

| 6,934,676 B2 | 8/2005 | Wang et al. |
| 8,484,022 B1 | 7/2013 | Vanhoucke |

(Continued)

FOREIGN PATENT DOCUMENTS

| KR | 1020190049552 A | 5/2019 |
| KR | 1020190096281 A | 8/2019 |
| KR | 1020200039530 A | 4/2020 |

OTHER PUBLICATIONS

D. Yu and J. Li, 'Recent Progresses in Deep Learning based Acoustic Models (Updated)'. arXiv, 2018. (Year: 2018).*

(Continued)

*Primary Examiner* — Paras D Shah
(74) *Attorney, Agent, or Firm* — William Park & Associates Ltd.

(57) ABSTRACT

An audio signal encoding and decoding method using a neural network model, a method of training the neural network model, and an encoder and decoder performing the methods are disclosed. The encoding method includes computing the first feature information of an input signal using a recurrent encoding model, computing an output signal from the first feature information using a recurrent decoding model, calculating a residual signal by subtracting the output signal from the input signal, computing the second feature information of the residual signal using a nonrecurrent encoding model, and converting the first feature information and the second feature information to a bitstream.

6 Claims, 9 Drawing Sheets

(56) References Cited

U.S. PATENT DOCUMENTS

| | | | |
|---|---|---|---|
| 2010/0166054 A1* | 7/2010 | Wirick | H04N 19/105 |
| | | | 375/240.1 |
| 2019/0164052 A1* | 5/2019 | Sung | G06N 3/082 |
| 2019/0246102 A1* | 8/2019 | Cho | G06N 3/045 |
| 2020/0021813 A1* | 1/2020 | Tanner | H04N 19/124 |
| 2020/0111501 A1 | 4/2020 | Sung et al. | |
| 2020/0128307 A1* | 4/2020 | Li | H04N 19/119 |
| 2021/0074308 A1* | 3/2021 | Skordilis | G06N 3/045 |
| 2021/0089863 A1* | 3/2021 | Yang | G06N 3/063 |
| 2022/0005488 A1* | 1/2022 | Sung | G06N 3/044 |

OTHER PUBLICATIONS

L. Jiang, M. Xu, T. Liu, M. Qiao, and Z. Wang, 'DeepVS: A Deep Learning Based Video Saliency Prediction Approach', in Computer Vision \textendash ECCV 2018, Springer International Publishing, 2018, pp. 625-642. (Year: 2018).*

Lai Jiang et al., Predicting Video Saliency with Object-to-Motion CNN and Two-layer Convolutional LSTM, Computer Science, ECCV2018, pp. 1-13, Jan. 14, 2019.

Yang Yang et al., Feedback Recurrent Autoencoder, International Conference on Acoustics, Speech and Signal Processing (ICASSP) 2020, IEEE, pp. 3347-3351.

\* cited by examiner

METHODS OF ENCODING AND DECODING AUDIO SIGNAL USING NEURAL NETWORK MODEL, AND DEVICES FOR PERFORMING THE METHODS

CROSS-REFERENCE TO RELATED APPLICATION(S)

This application claims the priority benefit of Korean Patent Application No. 10-2020-0083075 filed on Jul. 6, 2020, and Korean Patent Application No. 10-2021-0049753 filed on Apr. 16, 2021, in the Korean Intellectual Property Office, the disclosures of which are incorporated herein by reference for all purposes.

BACKGROUND

1. Field

One or more example embodiments relate to an audio signal encoding and decoding method using a neural network model and an encoder and a decoder performing the method, and more particularly, to a technology for effectively removing short-term redundancy and long-term redundancy when encoding and decoding an audio signal.

2. Description of Related Art

In general, a sequential signal such as in a text, a speech, an audio, and a video may have short-term redundancy and long-term redundancy. Thus, for highly efficient compression of such a sequential signal as in a text, a speech, an audio, and a video, it may need to remove short-term redundancy and long-term redundancy simultaneously.

For example, most code-excited linear prediction (CELP)-based speech signal compression methods may remove long-term redundancy using a pitch filter and remove short-term redundancy using a linear prediction filter. For another example, video compression methods may remove long-term redundancy and short-term redundancy through an inter-frame prediction and an intra-frame prediction using a motion vector. Among typical neural network-based signal compression methods, an encoding and decoding method using a dimensionality reduction-based autoencoder may effectively encode and decode a non-sequential signal as in a still image. However, this encoding and decoding method may not be effective in encoding and decoding a sequential signal such as an audio signal and a video signal that include long-term redundancy. Also, using a recurrent neural network (RNN), which is another type of neural network, may be effective in representing long-term redundancy. However, it may be relatively ineffective in removing short-term redundancy included in frames.

Thus, there is a need for a coding scheme to effectively remove long-term redundancy and short-term redundancy in sequential signal such as audio signal.

SUMMARY

An aspect provides a method and device for effectively removing long-term redundancy and short-term redundancy when encoding and decoding an audio signal.

According to an example embodiment, there is provided an encoding method including computing the first feature information of an input signal using a recurrent encoding model, computing an output signal from the first feature information using a recurrent decoding model, calculating a residual signal based on a difference between the input signal and the output signal, computing the second feature information of the residual signal using a nonrecurrent encoding model, and converting the first feature information and the second feature information to a bitstream by quantizing the first feature information and the second feature information.

The recurrent encoding model may encode a current frame of the input signal using accumulated history information about previous frames of the input signal at each time step. The recurrent decoding model may reconstruct the original input signal by decoding the first feature information of the current fame using the history information about the previous frames of the input signal at each time step.

In detail, the recurrent decoding model may update the history information at a current time step using the history information at the previous time step and the first feature information of the current frame, and then compute the first output signal using the updated history information.

The history information at each time step may be used to model long-term redundancy for previous frames using a recurrent neural network, and be shared between the recurrent encoding model and the recurrent decoding model.

To this end, the encoding method may internally include a recurrent decoding operation in addition to such a recurrent encoding operation described in the foregoing. The updated history information at the current time step may be stored to be used as previous history information for encoding a frame at the next time step.

According to an example embodiment, there is provided a decoding method including extracting the first feature information of a current frame and the second feature information of a residual signal of the current frame by decoding a bitstream received from an encoding part, computing the first output signal from the first feature information using a recurrent decoding model, computing the second output signal from the second feature information using a nonrecurrent decoding model, and reconstructing the input signal by combining the first output signal and the second output signal.

The residual signal may be computed based on a difference between the input signal and an output signal generated by the recurrent decoding model.

The recurrent decoding model may update a history information at a current time step using the history information at a previous time step and the first feature information of the current frame, and compute the first output signal using the updated history information. The updated history information may be stored to decode a feature information using the recurrent decoding model at the next time step.

According to an example embodiment, there is provided a method of training a neural network model, the method including computing the first feature information of an input signal using a recurrent encoding model, quantizing the first feature information, computing the first output signal from the quantized first feature information using a recurrent decoding model, updating model parameters of the recurrent encoding model and the recurrent decoding model to minimize a loss function based on a difference between the input signal and the first output signal, computing a residual signal by subtracting the first output signal from the input signal, computing the second feature information of the residual signal using a nonrecurrent encoding model, quantizing the second feature information, computing the second output signal from the quantized second feature information using a nonrecurrent decoding model, and updating model parameters of the nonrecurrent encoding model and the nonrecurrent decoding model to minimize a loss function based on a difference between the residual signal and the second output signal.

The recurrent encoding model may encode a current frame of the input signal using history information of the input signal at a previous time step. The recurrent decoding model may update the history information at a current time step using the history information at the previous time step and the first feature information of the current frame, and compute an output signal using the updated history information.

The updated history information at the current time step may be stored for encoding and decoding at the next time step.

According to another example embodiment, there is provided an encoding method including computing the first feature information of an input signal using a nonrecurrent encoding model, computing the second feature information from the first feature information using a recurrent encoding model, and quantizing the second feature information and converting the quantized second feature information to a bitstream. The recurrent encoding model may encode the first feature information at the current time step using a history information of the first feature information at a previous time step.

The encoding method may include updating a history information at the current time step using the history information of the first feature information at the previous time step and the second feature information at the current time step, and computing the first feature information using the updated history information. The updated history information may be stored to encode the first feature at the next time step.

According to another example embodiment, there is provided a decoding method including reconstructing second feature information for a current frame of an input signal by dequantizing a bitstream received from the encoding part, reconstructing the first feature information from the second feature information using a recurrent decoding model, and computing an output signal from the first feature information using a nonrecurrent decoding model. The recurrent decoding model may update a history information at a current time step using the history information of the first feature information at the previous time step and the second feature information at the current time step, and reconstruct the first feature information using the updated history information. The updated history information may be stored to reconstruct the first feature information from the second feature information at the next time step.

According to another example embodiment, there is provided a method of training a neural network model, the method including computing the first feature information of an input signal using a nonrecurrent encoding model, computing the second feature information from the first feature information using a recurrent encoding model, quantizing the second feature information, reconstructing the first feature information from the quantized second feature information using a recurrent decoding model, reconstructing an output signal from the first feature information using a nonrecurrent decoding model, and updating model parameters of the nonrecurrent encoding and decoding models and the recurrent encoding and decoding models based on a difference between the input signal and the output signal.

The recurrent decoding model may update a history information at the current time step using the history information of the first feature information at the previous time step and the second feature information at the current time step, and reconstruct the first feature information at the current time step using the updated history information. The updated history information may be stored to reconstruct the first feature information from the second feature information at the next time.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
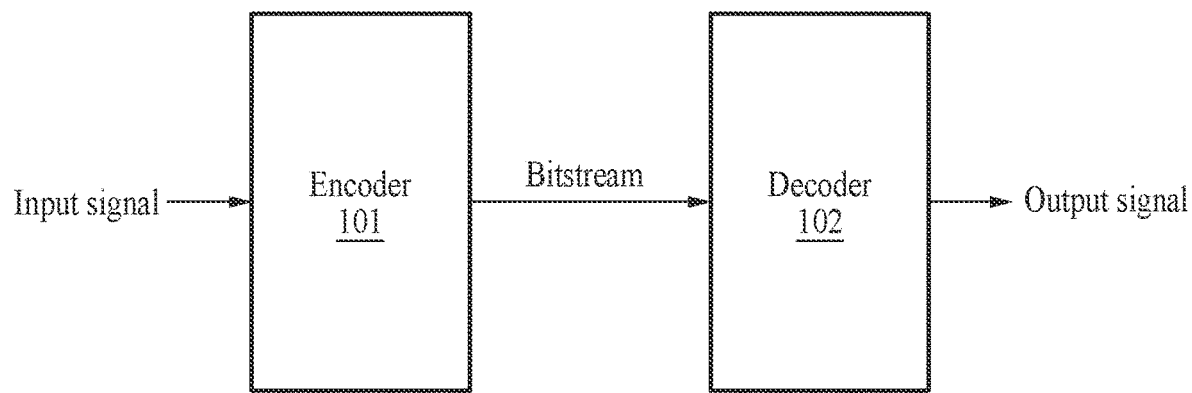
FIG. 1 is a diagram illustrating an example of an encoder and an example of a decoder according to example embodiments.

Hereinafter, example embodiments will be described in detail with reference to the accompanying drawings. However, various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In the description of example embodiments, detailed description of structures or functions that are thereby known after an understanding of the disclosure of the present application will be omitted when it is deemed that such description will cause ambiguous interpretation of the example embodiments.

In addition, terms such as first, second, A, B, (a), (b), and the like may be used herein to describe components. Each of these terminologies is not used to define an essence, order, or sequence of a corresponding component but used merely to distinguish the corresponding component from other component(s). Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Hereinafter, example embodiments will be described in detail with reference to the accompanying drawings. Regarding the reference numerals assigned to the elements in the drawings, it should be noted that the same elements will be designated by the same reference numerals, wherever possible, even though they are shown in different drawings.

FIG. 1 is a diagram illustrating an example of an encoder and an example of a decoder according to example embodiments.

The present disclosure relates to a technology for effectively removing long-term redundancy and short-term redundancy when encoding and decoding an audio signal by sequentially using a recurrent encoding model, a recurrent decoding model, a nonrecurrent encoding model, and a nonrecurrent decoding model.

Referring to FIG. 1, an encoder 101 may encode an input signal to generate a bitstream, and a decoder 102 may decode the bitstream received from the encoder 101 to generate an output signal.

The encoder 101 and the decoder 102 may each include a processor, and the respective processors of the encoder 101 and the decoder 102 may perform an encoding method and a decoding method. The input signal described herein may be an original audio signal that is a target to be encoded and may include a plurality of frames. The output signal described herein may be an audio signal reconstructed from the encoded input signal by the decoder 102.

The recurrent encoding model and the recurrent decoding model may each be a deep learning-based neural network model used to effectively remove long-term redundancy. For example, the recurrent encoding model and the recurrent decoding model may be an encoder and decoder part of autoencoder with a recurrent structure for signal compression and reconstruction. For example, a recurrent part of the recurrent autoencoder may be implemented using one of popular recurrent networks such as recurrent neural network (RNN), long short-term memory (LSTM), gated recurrent unit (GRU), and the like. These exemplary recurrent networks may have an internal network structure such as fully-connected network (FCN), convolutional neural network (CNN), and the like.

The recurrent encoding model, as a model configured to encode a current frame of an input signal, may be effective in removing long-term redundancy for the current frame using history information about previous frames of the input signal. Thus, the recurrent encoding model may eliminate the long-term redundancy in the input signal and then output the resulting feature information.

The recurrent decoding model may reconstruct the current frame of the input signal using the history information about previous frames of the input signal and the feature information of the current frame.

The history information represents the long-term redundancy contained in the past input frames, and it is utilized as common input to the recurrent encoding and decoding models.

The recurrent encoding model and the recurrent decoding model are not limited to the foregoing examples, and various neural network models that are available to those having ordinary skill in the art may also be used.

In contrast to the recurrent models, the nonrecurrent encoding model and the nonrecurrent decoding model may each be a deep learning-based neural network model used to effectively remove short-term redundancy of a current frame independently of previous frames of an input signal. For example, the nonrecurrent encoding model and the nonrecurrent decoding model may be a encoder and decoder part of autoencoder without recurrent structure for signal compression and reconstruction. For example, the nonrecurrent autoencoder may be implemented using various types of autoencoder such as deterministic autoencoder, variational autoencoder (VAE), and the like. These exemplary nonrecurrent neural networks may have an internal network structure such as FCN, CNN, and the like.

The nonrecurrent encoding model may encode the current frame of the input signal independently of previous frames of the input signal by removing short-term redundancy in the input signal and outputting the resulting feature information.

The nonrecurrent decoding model may decode the feature information of the input signal independently of the previous frames to compute an output signal.

The nonrecurrent encoding model and the nonrecurrent decoding model are not limited to the foregoing examples, and various neural network models that are available to those having ordinary skill in the art may also be used.

A detailed method of training the recurrent encoding and decoding models and the nonrecurrent encoding and decoding models according to an example embodiment will be described hereinafter with reference to FIG. 5.

According to an example embodiment, in a residual structure encoding and decoding method, the encoder 101 may compute a feature information of an input signal using a recurrent encoding model, and quantize the feature information. The encoder 101 may decode the quantized feature information to compute an output signal using a recurrent decoding model. The encoder 101 may then compute a residual signal by subtracting the output signal from the input signal. The encoder 101 may compute a feature information of the residual signal using a nonrecurrent encoding model and quantize the feature information of the residual signal. The encoder 101 may convert the quantized feature information of the input signal and the residual signal to bitstream respectively, and multiplex them into overall bitstream.

Herein, the feature information of the residual signal computed using the nonrecurrent encoding model may be referred as to the second feature information, and the feature information of the input signal computed using the recurrent encoding model may be referred as to the first feature information.

The decoder 102 may demultiplex the overall bitstream into bitstream of the first feature information and bitstream of the second feature information, and dequantize them to reconstruct the quantized first feature information and the quantized second feature information, respectively. The decoder 102 may then compute the first output signal from the quantized first feature information using the recurrent decoding model, and compute the second output signal from the quantized second feature information using the nonrecurrent decoding model.

The first output signal described herein may correspond to an input signal reconstructed by the recurrent decoding model, and the second output signal described herein may correspond to a residual signal reconstructed by the nonrecurrent decoding model. The decoder 102 may reconstruct a final output signal by adding the first output signal and the second output signal.

According to another example embodiment, in a nested structure encoding and decoding method, the encoder 101 may compute a feature information of an input signal using a nonrecurrent encoding model, and then compute another feature information of the feature information obtained by the nonrecurrent encoding model using a recurrent encoding model. The encoder 101 may quantize another feature information and convert it to bitstream. The feature information obtained by the nonrecurrent encoding model may be referred herein as to the first feature information, and the feature information obtained by the recurrent encoding model may be referred herein as to the second feature information.

The nonrecurrent encoding model may be used to compute the first feature information for the input signal, and the recurrent encoding model may be used to compute the second feature information for the first feature information.

The recurrent encoding model may encode the first feature information of a current frame of the input signal using history information about the first feature information of previous frames of the input signal to output the second feature information.

The second feature information may be converted to a bitstream through quantization.

The decoder 102 may dequantize the bitstream to produce the quantized second feature information. The decoder 102 may compute the first feature information from the quantized second feature information using the recurrent decoding model, and compute an output signal from the first feature information using the nonrecurrent decoding model.

The recurrent decoding model may compute the first feature information from the second feature information using the history information about the first feature information of the previous frames. The nonrecurrent decoding model may compute the output signal from the first feature information.

A detailed method of training the recurrent encoding and decoding models and the nonrecurrent encoding and decoding models according to another example embodiment will be described hereinafter with reference to FIG. 9.

Figure 2:
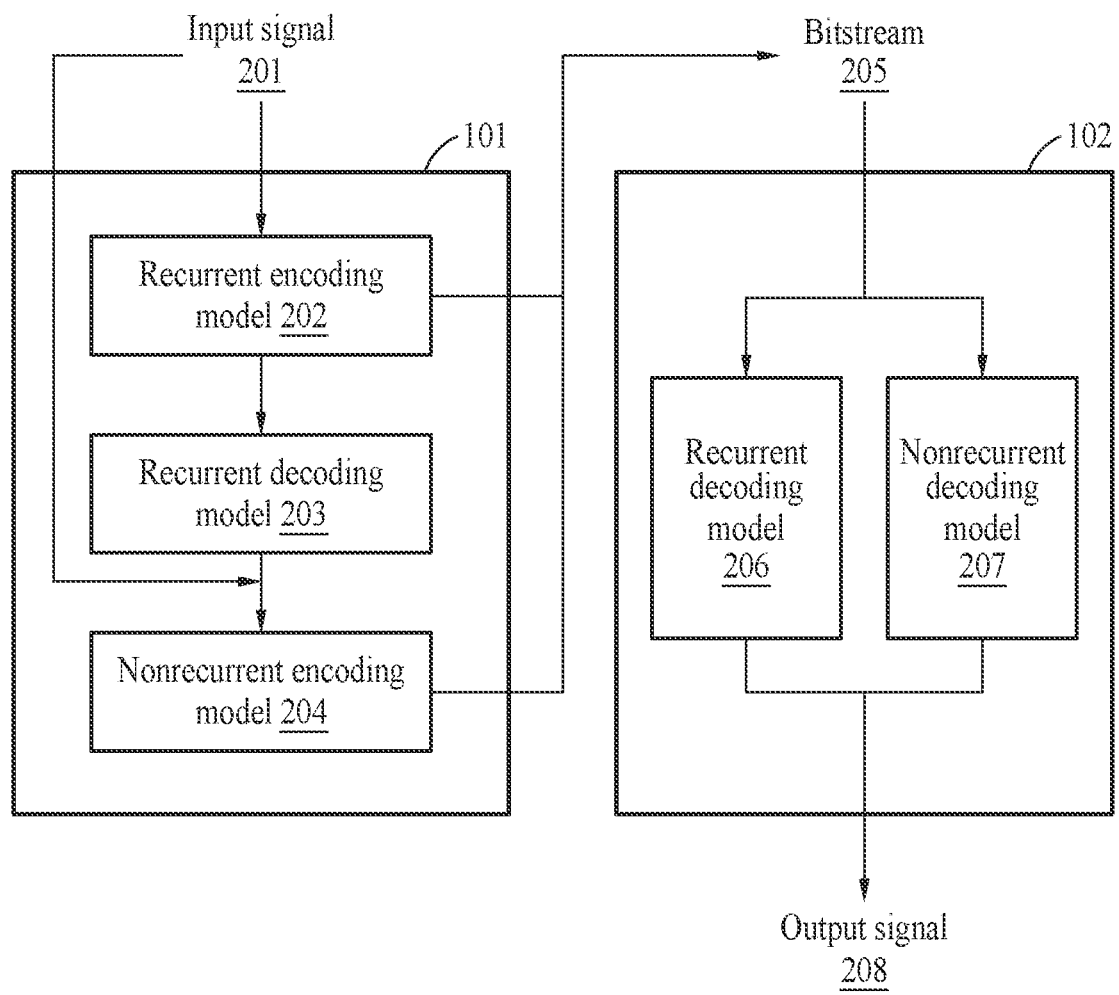
FIG. 2 is a diagram illustrating an example of a configuration of neural network models included in an encoder and a decoder according to an example embodiment.

FIG. 2 is a diagram illustrating an example of a configuration of neural network models included in an encoder and a decoder in a residual structure encoding and decoding method according to an example embodiment.

The encoder 101 may compute the first feature information from an input signal 201 using a recurrent encoding model 202. The first feature information may correspond to the feature information computed by the recurrent encoding model 202.

The encoder 101 may use the input signal 201 at the current time step and history information as inputs to the recurrent encoding model 202 to encode the input signal 201. The recurrent encoding model 202 may be a neural network model that is trained to compute the first feature information using the input signal 201 and the history information.

The encoder 101 may produce a quantized first feature information as an input to a recurrent decoding model 203 and the first bitstream by quantizing the first feature information obtained by the recurrent encoding model 202.

The encoder 101 may compute an output signal by decoding the quantized first feature information using the recurrent decoding model 203. The encoder 101 may input the quantized first feature information and the history information to the recurrent decoding model 203. The output signal may correspond to a signal reconstructed by the recurrent decoding model 203. The encoder 101 may internally compute a updated history information at the current time step using the quantized first feature information and the input history information in the recurrent decoding model 203.

The encoder 101 may compute the first output signal using the updated history information. The updated history information at the current time may be used as input history information for the recurrent encoding model 202 and the recurrent decoding model 203 to encode an input signal at the next time step. Thus, the recurrent encoding model 202 and the recurrent decoding model 203 of the encoder 101 may share the history information at each time step.

The encoder 101 may determine a residual signal by subtracting the first output signal 203 from the input signal 201. The residual signal may correspond to an error signal indicating a difference between the input signal 201 and the output signal of the recurrent decoding model 203.

The encoder 101 may compute the second feature information from the residual signal using the nonrecurrent encoding model 204. The nonrecurrent encoding model 204 may be a neural network model that is trained to compute the second feature information from the residual signal.

The encoder 101 may produce the second bitstream by quantizing the second feature information obtained by the nonrecurrent encoding model 204. The encoder 101 may produce an overall bitstream 205 by multiplexing the first and the second bitstream.

The decoder 102 may receive the overall bitstream 205, and reconstruct the quantized first feature information and the quantized second feature information by demultiplexing the overall bitstream into the first and the second bitstream and dequantizing the respective bitstream.

The decoder 102 may compute the first output signal from the quantized first feature information using a recurrent decoding model 206, and compute the second output signal from the quantized second feature information using a nonrecurrent decoding model 207.

The decoder 102 may compute the final output signal 208 by adding the first output signal and the second output signal. The first output signal may correspond to an output signal computed by the recurrent decoding model 206, and the second output signal may correspond to an output signal computed by the nonrecurrent decoding model 207.

The decoder 102 may compute the updated history information at the current time from the first feature information and the input history information using the recurrent decoding model 206, and compute the first output signal using the updated history information.

This foregoing process may be the same as one performed in the recurrent decoding model 203 of the encoder 101, and thus the recurrent decoding model 203 of the encoder 101 and the recurrent decoding model 206 of the decoder 102 may compute the first output signal from the quantized first feature information using history information synchronized between encoder 101 and decoder 102 at each time step.

Figure 3:
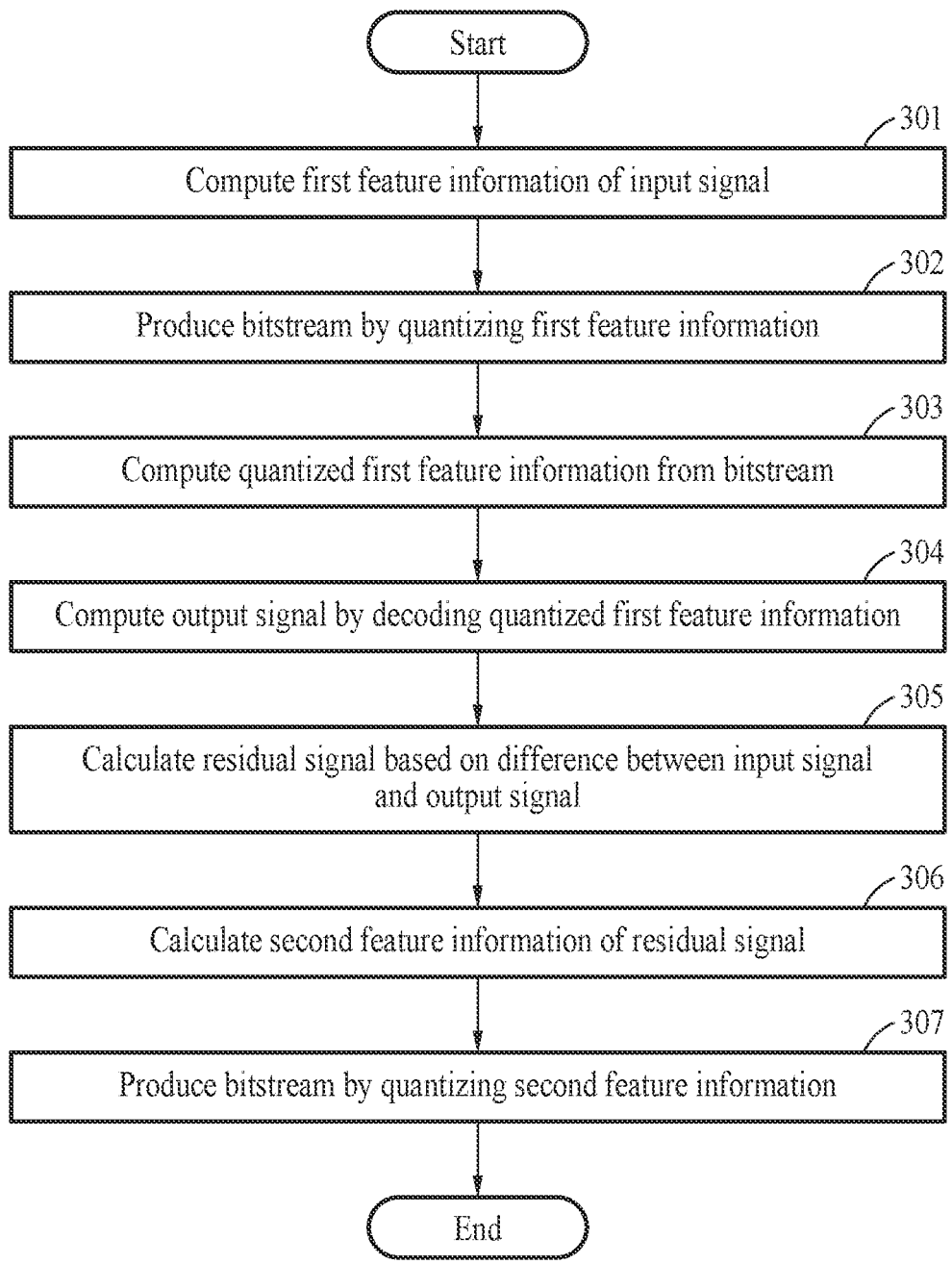
FIG. 3 is a flowchart illustrating an example of an encoding method using a neural network model according to an example embodiment.

FIG. 3 is a flowchart illustrating an example of an encoding method using a neural network model according to an example embodiment.

An input signal of an encoder may indicate a frame consisting of a predefined number of samples at a specific time step t. An overlap interval may exist across frames. The encoder may operate on a frame-by-frame basis.

In operation 301, the encoder may compute the first feature information of an input signal using a recurrent encoding model. The encoder may compute the first feature information by feeding the input signal and the history information to the recurrent encoding model.

The history information may be initialized to arbitrary values at an initial time step (t=0), and then be updated to new history information through decoding process at each time step t using history information at time step t−1 and the first feature information of the input signal obtained through the recurrent encoding model. Thus, information of previous time steps may be maintained during encoding operation.

The history information described herein may be history or state information that is transferred from a current time step to a next time step through a recurrent path of a recurrent neural network. The history information may be updated at each time step using a history information and an input signal, and the updated history information may be used to compute a history information at the next time step.

In operation 302, the encoder may produce the first bitstream by quantizing the first feature information computed using the recurrent encoding model. In operation 303, the encoder may extract the quantized first feature information from the bitstream.

In operation 304, the encoder may compute an output signal from the quantized first feature information. The encoder may update the history information using the first feature information and the input history information in a recurrent decoding model, and compute the first output signal from the updated history information. The updated history information may be used as an input to the recurrent encoding model and the recurrent decoding model for encoding an input signal at the next time step.

In operation 305, the encoder may compute a residual signal by subtracting the first output signal from the input signal. In operation 306, the encoder may compute the second feature information from the residual signal using a nonrecurrent encoding model.

In operation 307, the encoder may produce the second bitstream by quantizing the second feature information. The encoder may multiplex the first bitstream and the second bitstream, and transmit the resulting overall bitstream to a decoder.

Figure 4:
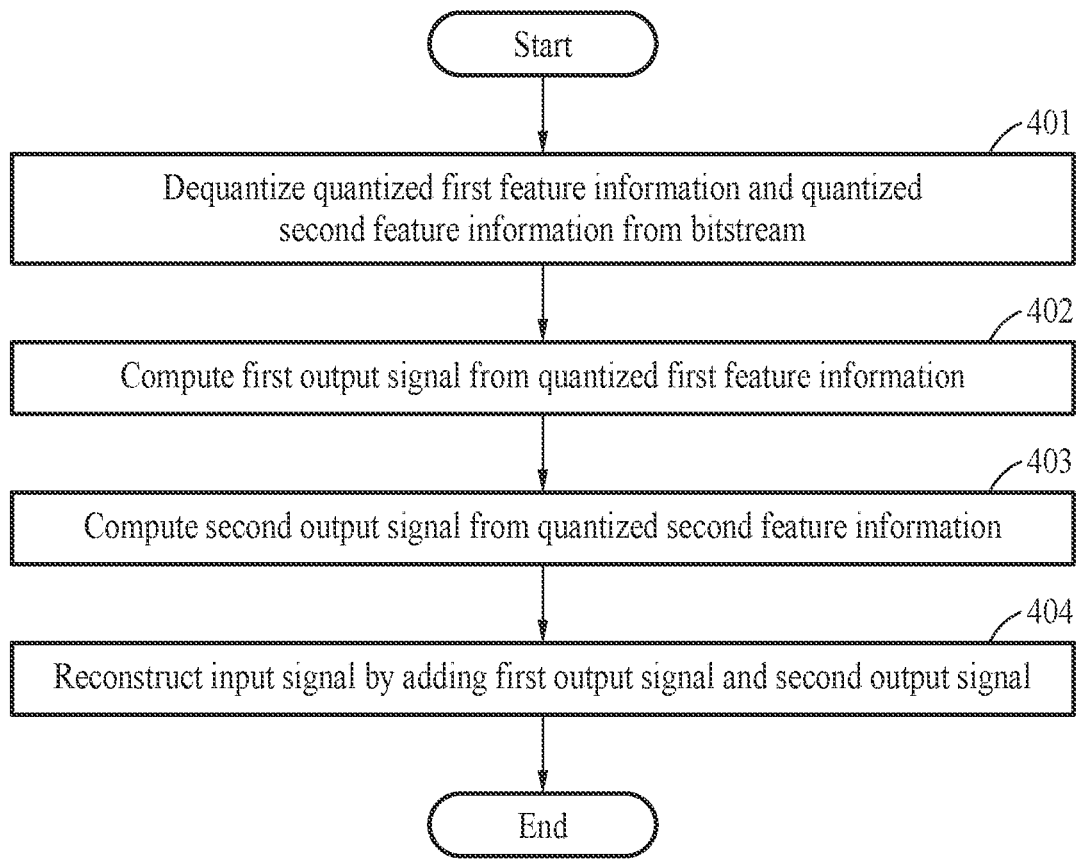
FIG. 4 is a flowchart illustrating an example of a decoding method using a neural network model according to an example embodiment.

FIG. 4 is a flowchart illustrating an example of a decoding method using a neural network model according to an example embodiment.

In operation 401, a decoder may demultiplex the overall bitstream received from the encoder, and dequantize the first bitstream and the second bitstream to reconstruct the quantized first feature information and the quantized second feature information.

In operation 402, the decoder may compute the first output signal from the quantized first feature information. The decoder may compute the first output signal from the quantized first feature information and the history information using a recurrent decoding model. The history information updated in the decoding process may be used to compute the first feature information at the next time step.

In operation 403, the decoder may compute the second output signal from the quantized second feature information using a nonrecurrent decoding model.

The first output signal may be an output signal computed using the recurrent decoding model. The second output signal may be a reconstructed residual signal which is an output signal computed using the nonrecurrent decoding model. In operation 404, the decoder may reconstruct an input signal by adding the first output signal and the second output signal.

Figure 5:
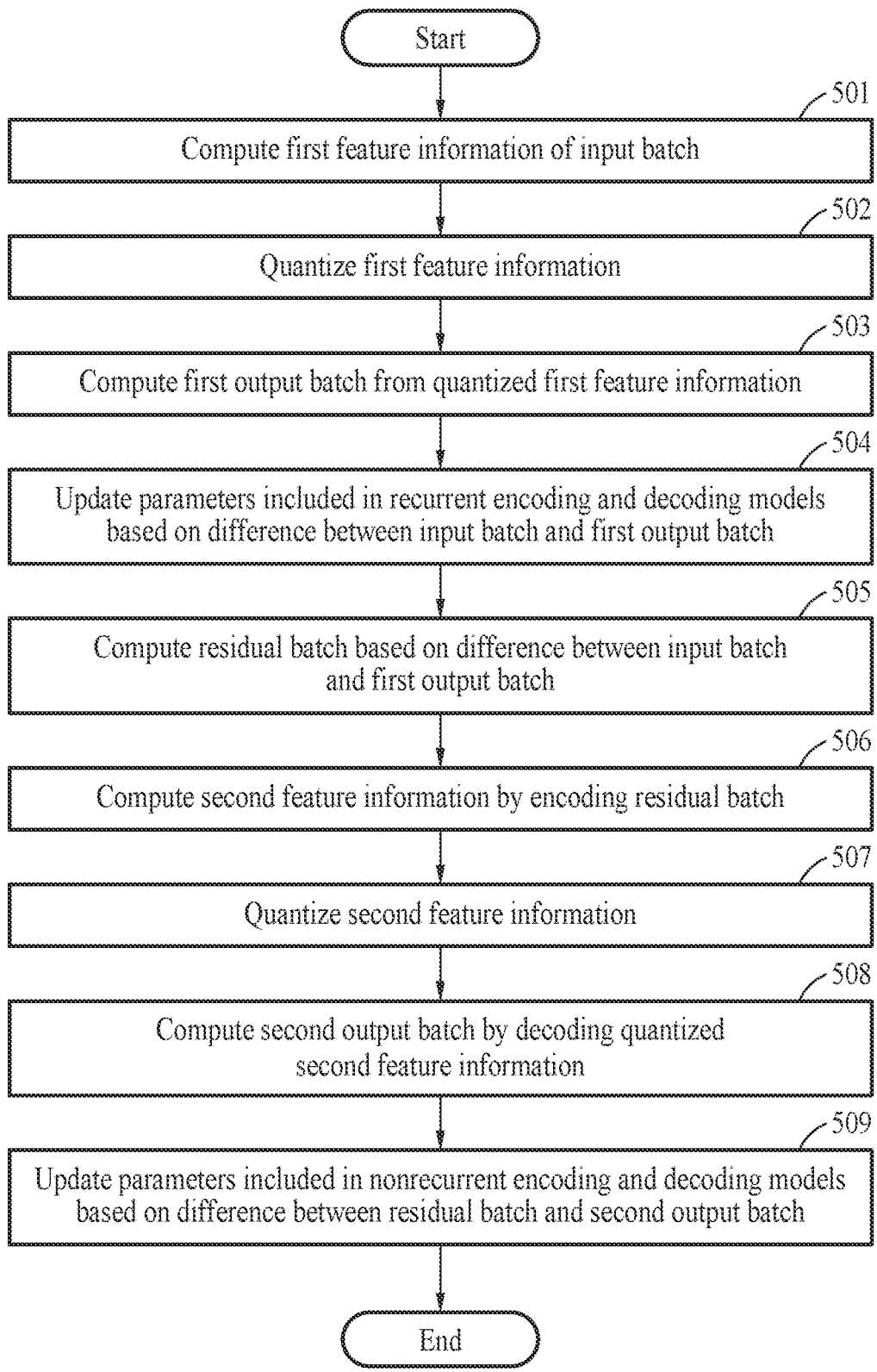
FIG. 5 is a flowchart illustrating an example of a method of training a neural network model according to an example embodiment.

FIG. 5 is a flowchart illustrating an example of a method of training a neural network model according to an example embodiment.

In an audio database provided for training the encoding and decoding models, each audio materials may be divided into multiple frames consisting of N consecutive audio samples, and then frames are arranged into multiple groups of temporally-consecutive T frames. Groups of T frames may be grouped randomly into multiple sets of B groups.

A training process for a recurrent neural network model in the example embodiment may be iteratively performed on B frames corresponding to each time step in the set of (B×T) frames. The B frames corresponding to each time step may be referred as to batch.

That is, a batch corresponding to each time step may be sequentially fed to the recurrent neural network model. According to an example embodiment, the history information for a recurrent encoding model and a recurrent decoding model may be initialized to preset values, for example, zeros.

In operation 501, an encoder or decoder may compute the first feature information of an input batch. The encoder or decoder may compute the first feature information from the input batch at the time step t and the history information at the time step t−1 using the recurrent encoding model. The first feature information may be an one-dimensional (1D) vector, a two-dimensional (2D) matrix or a multi-dimensional tensor for each frame in the input batch depending on a structure of a recurrent neural network.

In operation 502, the encoder or decoder may quantize the first feature information. The encoder or decoder may compute the quantized first feature information through quantization and dequantization of the first feature information. The quantization may generally be a non-differentiable operation, and thus model parameters may not be updated using error backpropagation required in the training process. Thus, in the training process, a relaxed quantization method such as softmax quantization, may be applied to quantize the first feature information.

In operation 503, the encoder or decoder may compute the first output batch from the quantized first feature information. The encoder or decoder may compute the updated history information from the quantized first feature information and the history information using the recurrent decoding model, and then compute the first output batch from the updated history information. The first output batch may correspond to an input batch reconstructed by the recurrent decoding model.

In operation 504, the encoder or decoder may update model parameters of the recurrent encoding model and the recurrent decoding model based on a difference between the first output batch and the input batch.

The encoder or decoder may update model parameters of the recurrent encoding model and the recurrent decoding model to minimize a loss function based on the difference between the first output batch and the input batch.

For example, the encoder or decoder may determine the first loss function for updating the model parameters of the recurrent encoding and decoding models by a weighted sum of a signal distortion as the difference measure between the first output batch and the input batch and an entropy loss corresponding to an estimated number of bits required to encode the first feature information. The entropy may be calculated using a probability distribution corresponding to histogram of symbols used to quantize the first feature information, and indicate a lower bound of number of bits required for an actual conversion of a bitstream. The entropy loss may be included in an overall loss function for the purpose of controlling a bit rate of the encoder. The signal distortion may be measured using norm-based methods such as mean squared error (MSE).

The encoder or decoder may update the model parameters of the recurrent encoding and decoding models such that the first loss function is minimized in the training process. For example, the encoder or decoder may update the model parameters of the recurrent encoding and decoding models by using an error backpropagation based on the first loss function.

The encoder or decoder may iteratively perform operations 501 through 504 at every time step, from t=0 to t=T−1.

The encoder or decoder may iteratively perform on multiple epochs until the recurrent encoding and decoding models are sufficiently trained. In operation 505, the encoder or decoder may compute a residual batch by subtracting the first output batch of the trained recurrent encoding and decoding models from the input batch in order to train a nonrecurrent encoding model and a nonrecurrent decoding model.

The residual batch may be calculated by subtracting the first output batch reconstructed using the trained recurrent encoding and decoding models from the original input batch. By applying the foregoing process to the entire training database, it is possible to construct a residual database for training the nonrecurrent encoding and decoding models.

For subsequent operations, the residual database may be divided into frames of N samples, and then a training process for a nonrecurrent neural network model may be performed on batches of B frames.

In operation 506, the encoder or decoder may compute the second feature information by encoding the residual batch using the nonrecurrent encoding model. The second feature information may be an 1D vector, a 2D matrix or a multi-dimensional tensor for each frame in the input batch depending on a structure of a nonrecurrent neural network.

In operation 607, the encoder or decoder may compute the quantized second feature information through quantization and dequantization of the second feature information. The quantization operation may generally be non-differentiable, and thus model parameters may not be updated using an error backpropagation required in the training process. Thus, in the training process, a relaxed quantization method such as softmax quantization, may be applied to quantize the second feature information.

In operation 508, the encoder or decoder may compute the second output batch from the quantized second feature information using the nonrecurrent decoding model.

In operation 509, the encoder or decoder may update model parameters of the nonrecurrent encoding and decoding models based on a difference between the residual batch and the second output batch. The encoder or decoder may update the model parameters of the nonrecurrent encoding and decoding models to minimize the second loss function based on the difference between the residual batch and the second output batch.

For example, the second loss function for updating the model parameters of the nonrecurrent encoding and decoding models may be determined to be a weighted sum of a signal distortion as the difference measure between the residual batch and the second output batch and an entropy loss corresponding to an estimated number of bits required to encode the second feature information. The signal distortion may be measured using a norm-based method such as MSE.

The encoder or decoder may update the model parameters of the nonrecurrent encoding and decoding models such that the second loss function is minimized in the training process. For example, the encoder or decoder may update the model parameters of the nonrecurrent encoding and decoding models through error backpropagation based on the second loss function. The encoder or decoder may iteratively perform on multiple epochs until the nonrecurrent encoding and decoding models are sufficiently trained.

Figure 6:
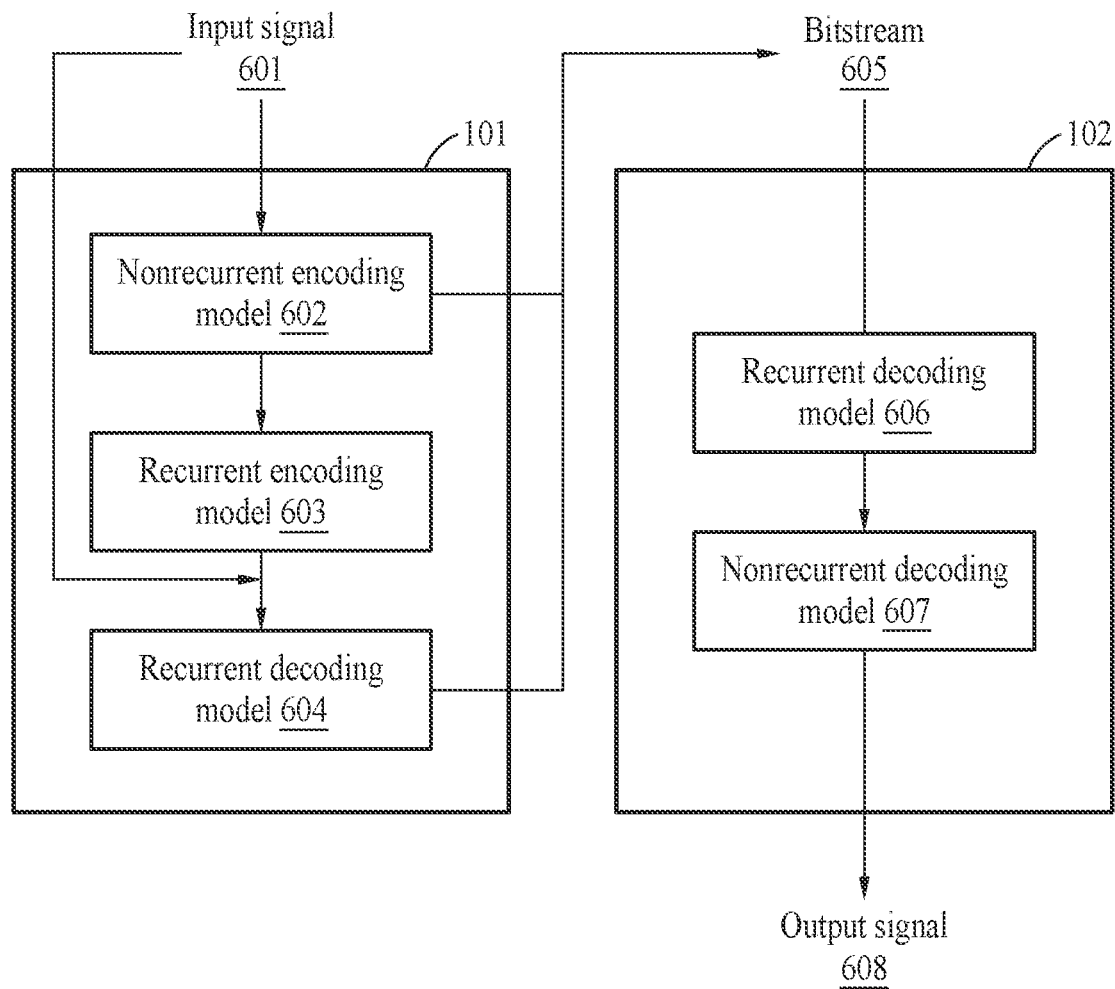
FIG. 6 is a diagram illustrating an example of a configuration of neural network models included in an encoder and a decoder according to another example embodiment.

FIG. 6 is a diagram illustrating an example of a configuration of neural network models included in an encoder and a decoder in a nested structure encoding and decoding method according to another example embodiment.

According to another example embodiment, the encoder 101 may compute the first feature information from an input signal 601 using a nonrecurrent encoding model 602. The first feature information may correspond to a feature of the input signal 601 obtained by the nonrecurrent encoding model 602.

The encoder 101 may compute the second feature information from the first feature information and the history information using a recurrent encoding model 603. According to another example embodiment, the feature information computed by the nonrecurrent encoding model 602 may be referred as to the first feature information, and the feature information computed by the recurrent encoding model 603 may be referred as to the second feature information.

The nonrecurrent encoding model 602 may be used to compute the first feature information from the input signal 601, and the recurrent encoding model 603 may be used to compute the second feature information from the first feature information.

To encode the first feature information of the input signal 601 at the current time step, the recurrent encoding model 603 may compute the second feature information using the first feature information and the history information.

The encoder 101 may produce a bitstream by quantizing the second feature information, and feed the quantized second feature information obtained through dequantization of the bitstream to a recurrent decoding model 604. The encoder 101 may compute the updated history information from the quantized second feature information and the history information, using the recurrent decoding model 604.

The updated history information may be used as a history information for the recurrent encoding model 603 and the recurrent decoding model 604 to encode first feature information at the next time step.

The decoder 102 may receive the bitstream and reconstruct the quantized second feature information through dequantization.

The decoder 102 may compute the first feature information from the quantized second feature information using a recurrent decoding model 606.

The decoder 102 may compute the updated history information from the quantized second feature information and the history information, and compute the first feature information from the updated history information using the recurrent decoding model 606.

This may be the same process as one performed by the recurrent decoding model 604 of the encoder 101, and thus the recurrent decoding model 604 of the encoder 101 and the recurrent decoding model 606 of the decoder 102 may decode the quantized second feature information using history information synchronized between encoder 101 and decoder 102.

The decoder 102 may compute an output signal 608 from the first feature information using a nonrecurrent decoding model 607. The decoder 102 may compute the output signal 608 by feeding the first feature information to the nonrecurrent decoding model 607.

Figure 7:
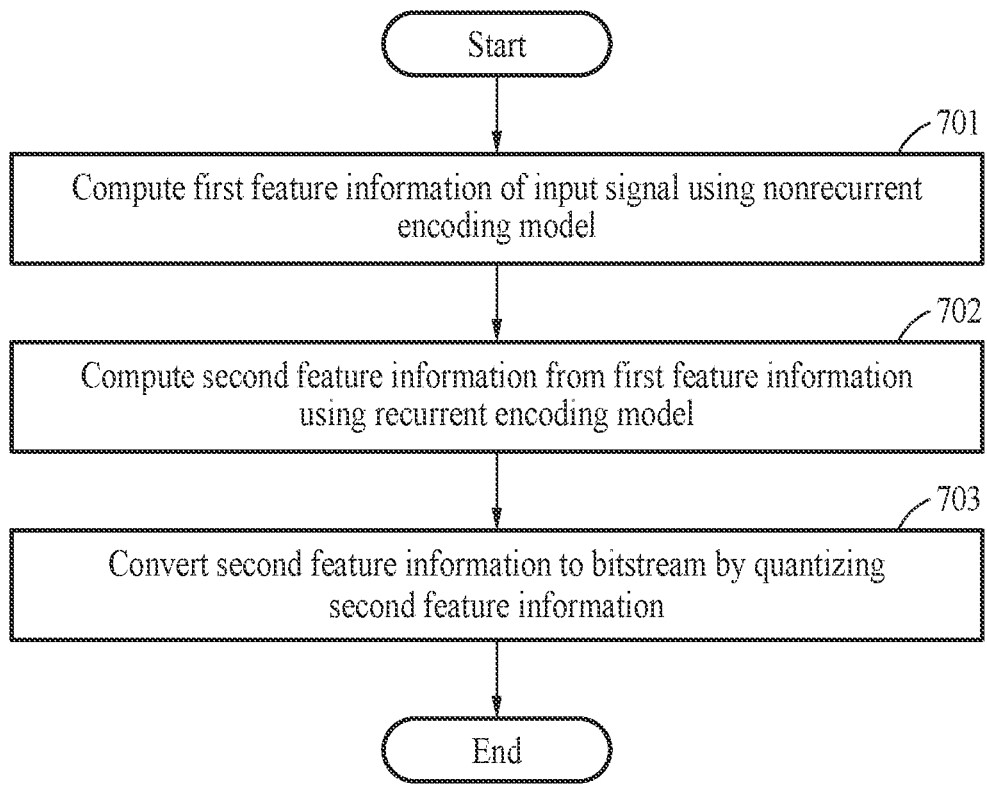
FIG. 7 is a flowchart illustrating an example of an encoding method using a neural network model according to another example embodiment.

FIG. 7 is a flowchart illustrating an example of an encoding method using a neural network model according to another example embodiment.

According to another example embodiment, an input signal of an encoder may correspond to a frame of a predefined number of samples at a specific time step t. An overlap interval may exist across frames. The encoder may operate on a frame-by-frame basis according to another example embodiment.

In operation 701, the encoder may compute the first feature information of an input signal using a nonrecurrent encoding model.

In operation 702, the encoder may compute the second feature information from the first feature information using a recurrent encoding model.

In operation 703, the encoder may convert the second feature information to a bitstream by quantizing the second feature information. The encoder may update the history information using the quantized second feature information and the history information, and compute the first feature information from the updated history information using a recurrent decoding model.

Figure 8:
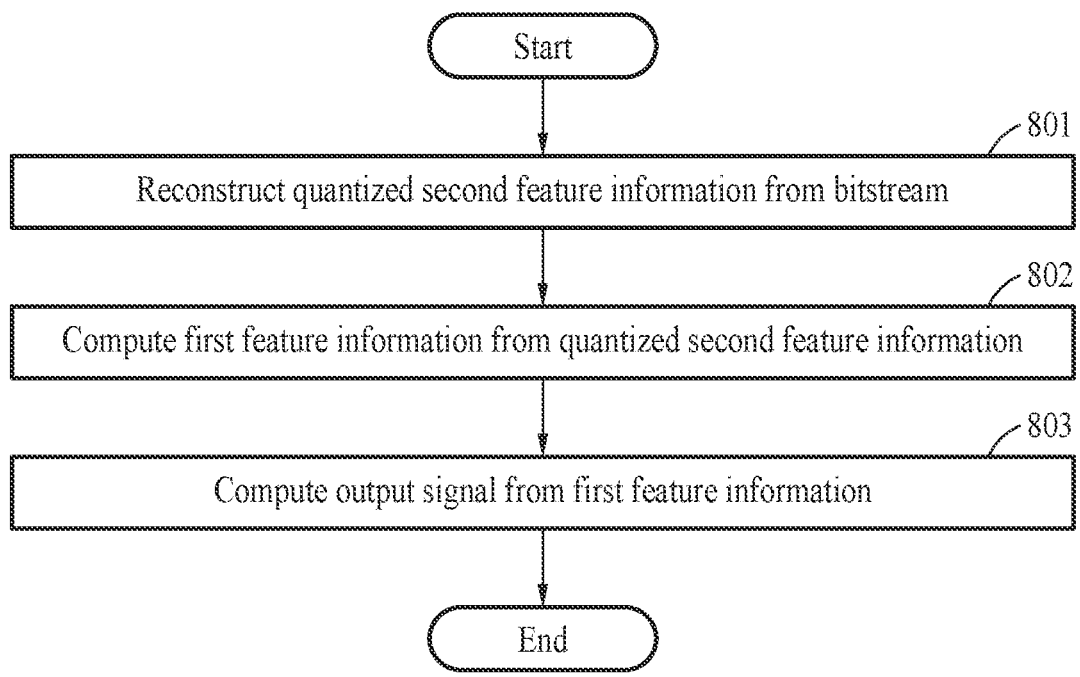
FIG. 8 is a flowchart illustrating an example of a decoding method using a neural network model according to another example embodiment.

FIG. 8 is a flowchart illustrating an example of a decoding method using a neural network model according to another example embodiment.

In operation 801, a decoder may reconstruct the quantized second feature information from a bitstream received from an encoder using dequantization. In operation 802, the decoder may compute the first feature information from the quantized second feature information. The decoder may compute the first feature information from the quantized second feature information and the history information using a recurrent decoding model. Herein, the history information updated in such a decoding process may be used to compute the first feature information at the next time step.

In operation 803, the decoder may compute an output signal from the first feature information. Thus, the decoder may reconstruct an input signal by decoding the first feature information using a nonrecurrent neural network model.

Figure 9:
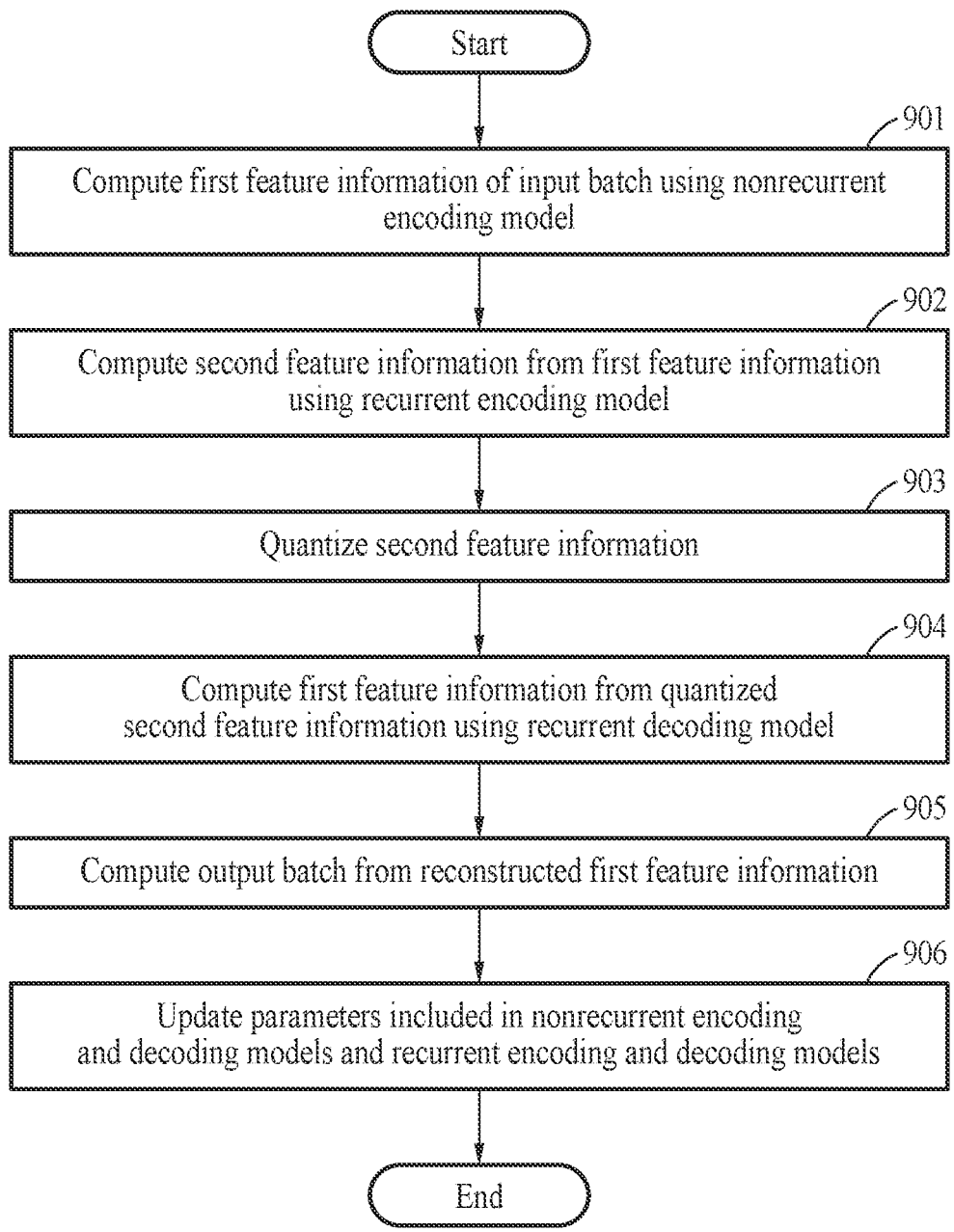
FIG. 9 is a flowchart illustrating an example of a method of training a neural network model according to another example embodiment.

FIG. 9 is a flowchart illustrating an example of a method of training a neural network model according to another example embodiment.

In an audio database provided for training the encoding and decoding models, each audio materials may be divided into multiple frames of N consecutive audio samples, and then frames are arranged into multiple groups of temporally-consecutive T frames. Groups of T frames may be grouped randomly into multiple sets of B groups. According to another example embodiment, a training process for a neural network model may be iteratively performed on B frames corresponding to each time step in the set of (B×T) frames. The B frames corresponding to each time step may be referred as to batch. That is, a batch corresponding to each time step may be sequentially fed to the neural network model. According to another example embodiment, the history information for a recurrent encoding model and a recurrent decoding model may be initialized to preset values, for example, zeros.

In operation 901, an encoder or decoder may compute the first feature information of an input batch using a nonrecurrent encoding model. The first feature information may be an 1D vector, a 2D matrix or a multiple-dimensional tensor for each frame in the input batch depending on a structure of a nonrecurrent neural network.

In operation 902, the encoder or decoder may compute the second feature information from the first feature information using a recurrent encoding model. The recurrent encoding model may compute the second feature information using the history information and the first feature information. The history information and the second feature information may be a 1D vector, a 2D matrix, or a multi-dimensional tensor for each frame in the batch depending on a structure of a recurrent neural network.

In operation 903, the encoder or decoder may quantize the second feature information. The encoder or decoder may compute the quantized second feature information through quantization and dequantization of the second feature information.

The quantization may generally be a non-differentiable operation, and thus model parameters may not be updated through error backpropagation required in the training process. Thus, in the training process, a relaxed quantization method such as softmax quantization, may be applied to quantize the second feature information.

In operation 904, the encoder or decoder may compute the first feature information from the quantized second feature information using a recurrent decoding model. The encoder or decoder may compute the updated history information using the quantized second feature information and the history information in the recurrent decoding model. The encoder or decoder may then compute the first feature information from the updated history information.

In operation 905, the encoder or decoder may compute an output batch from the reconstructed first feature information using a nonrecurrent decoding model.

In operation 906, the encoder or decoder may update model parameters of the nonrecurrent encoding and decoding models and the recurrent encoding and decoding models to minimize a loss function based on a difference between the input batch and the output batch.

For example, the loss function for updating the model parameters of the nonrecurrent encoding and decoding models and the recurrent encoding and decoding models may be determined to be a weighted sum of a signal distortion as the difference measure between the input batch and the output batch and an entropy loss corresponding to an estimated number of bits required to encode the second feature information. The signal distortion may be measured using a norm-based method such as MSE.

The encoder or decoder may update the model parameters of the nonrecurrent encoding and decoding models and the recurrent encoding and decoding models such that the loss function is minimized in the training process. For example, the encoder or decoder may update the model parameters of the nonrecurrent encoding and decoding models and the recurrent encoding and decoding models through error back-propagation based on the loss function.

The encoder or decoder may iteratively perform operations 901 through 906 at every time step from t=0 to t=T−1. The encoder or decoder may iteratively perform on multiple epochs until the parameters of the nonrecurrent encoding and decoding models and the recurrent encoding and decoding models are sufficiently trained.

According to example embodiments described herein, it is possible to effectively remove long-term redundancy and short-term redundancy when encoding and decoding an audio signal.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An encoding method for audio signal comprising:

computing first feature information of an input audio signal inputting the input audio signal to a recurrent encoding model;

generating a first bitstream by quantizing the first feature information;

generating a first output signal from a quantized first feature information by inputting the quantized first feature information a recurrent decoding model;

calculating a residual signal by subtracting the first output signal from the input audio signal;

computing second feature information of the residual signal by inputting the residual signal to a nonrecurrent encoding model;

generating a second bitstream by quantizing the second feature information; and outputting an overall bitstream by multiplexing the first bitstream and the second bitstream.

2. The encoding method of claim 1, wherein the recurrent encoding model is configured to encode the input signal using history information of a previous time step, and
the recurrent decoding model is configured to decode the quantized first feature information using the history information of the previous time step.

3. The encoding method of claim 2, wherein the recurrent decoding model is configured to update the history information using the quantized first feature information, compute the output signal using the updated history information, and store the updated history information for encoding at a next time step.

4. A decoding method for audio signal comprising:
reconstructing quantized first feature information of an input audio signal and quantized second feature information of a residual signal of the input audio signal, by demultiplexing and dequantizing an overall bitstream received from an encoder;
generating a first output signal from the quantized first feature information by inputting the quantized first feature information to a recurrent decoding model;
generating a second output signal from the quantized second feature information by inputting the quantized second feature information to a nonrecurrent decoding model; and
reconstructing the input audio signal by combining the first output signal and the second output signal,
wherein the residual signal is computed by subtracting the output signal computed using the nonrecurrent decoding model from the input audio signal.

5. The decoding method of claim 4, wherein the recurrent decoding model is configured to decode the quantized first feature information using history information of a previous time step.

6. The decoding method of claim 5, comprising:
updating the history information using the quantized first feature information;
computing the first output signal using the updated history information; and
storing the updated history information for decoding at a next time step.

* * * * *